E. A. KAMERER.
NUT LOCK.
APPLICATION FILED MAR. 21, 1912.
1,033,706.
Patented July 23, 1912.
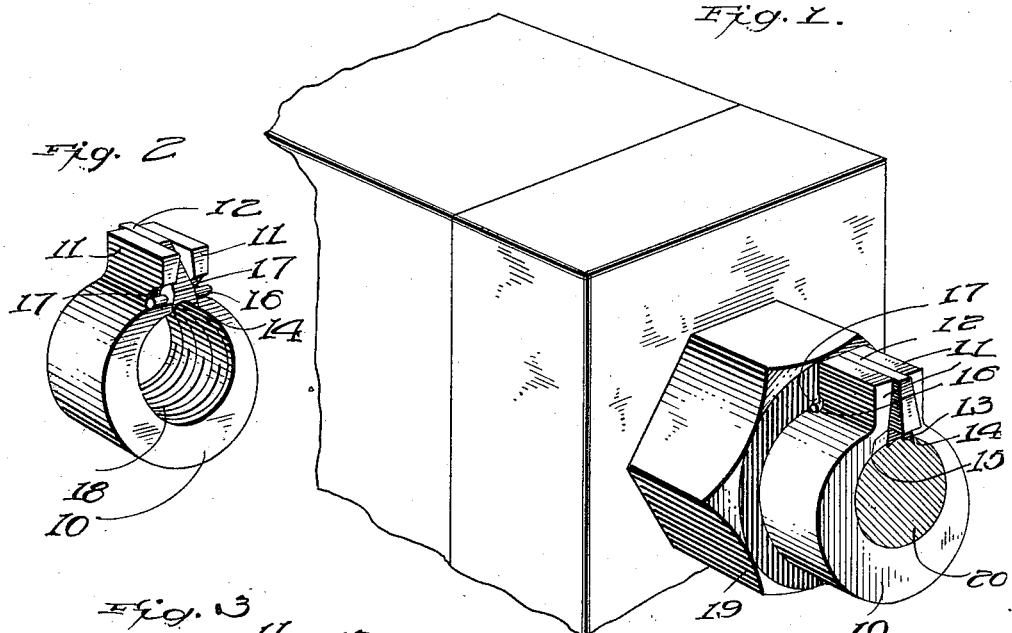
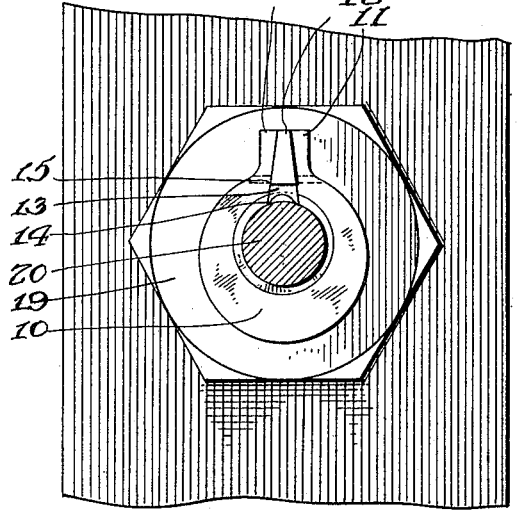
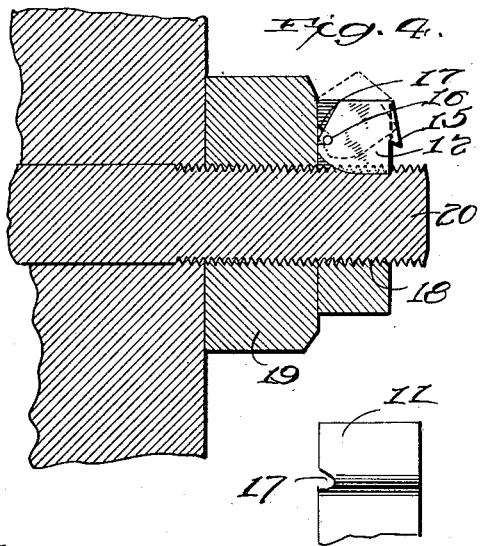
WITNESSES
INVENTOR
E. A. Kamerer
Attorney.

UNITED STATES PATENT OFFICE.

EMANUEL A. KAMERER, OF DICKSON, TENNESSEE, ASSIGNOR OF ONE-FOURTH TO JAMES W. McDANIEL, OF DICKSON, TENNESSEE.

NUT-LOCK.

1,033,706.   Specification of Letters Patent.   Patented July 23, 1912.

Application filed March 21, 1912. Serial No. 685,172.

*To all whom it may concern:*

Be it known that I, EMANUEL A. KAMERER, a citizen of the United States, residing at Dickson, in the county of Dickson and State of Tennessee, have invented certain new and useful Improvements in Nut-Locks, of which the following is a specification, reference being had therein to the accompanying drawing.

This invention relates to nut locks and has special reference to an improved form of locking nut designed to retain the main nut on the bolt.

The principal object of the invention is to provide a spring nut of novel construction which will securely hold itself in place upon the bolt.

With the above and other objects in view, the invention consists in general of certain novel constructions, arrangements and combinations of parts, as will be hereinafter fully described in the specification, illustrated in the drawings, and specifically claimed.

In the accompanying drawings, like characters of reference indicate like parts in the several views, and Figure 1 is a perspective view of the device used upon a bolt. Fig. 2 is a perspective view of the device removed from the bolt, the view being taken from the opposite end. Fig. 3 is a view of the bolt with the device applied thereto. Fig. 4 is a section through a bolt and nut with the device applied thereto. Fig. 5 is a perspective view of a locking wedge used in connection herewith. Fig. 6 is a detail side view of a portion of the lock nut showing certain notches.

The invention consists of a ring 10 of spring metal, preferably steel or the like split and provided with upturned ends 11. To strengthen this ring and cause the springing-effect of a certain wedge to take place at the desired point, the ring is made thicker opposite the upturned ends 11. The proximal sides of these lugs are inclined toward each other outwardly as indicated in Fig. 3 and between these inclined sides is held a wedge 12 similarly inclined and provided with a downwardly extending lug 13 having longitudinally arranged chiseled edges or teeth 14 formed by a groove cut in the face of the lug. The body of this wedge extends out beyond this lug to form a shoulder 15 which projects beyond the face of the member 10 which can be seen by reference to Fig. 4. On the rear end of this lug there is provided a pin 16 which is fitted in notches 17 formed on the lugs 11. The body 10 is provided with an eccentric screw threaded opening 18. In use the wedge is raised by tilting the same upwardly on the pivot pin and the device then screwed on the bolt. After screwing well down against the nut as at 19, the bolt being indicated at 20, a slight tap with the monkey wrench or hammer on the projecting wedge forces the same down and at the same time will allow the lugs 11 to approach each other and thus contract the ring 10 upon the bolt 20—thus acting as a double lock upon said bolt. Whenever it is wished to remove the device a chisel or the like may be inserted beneath the shoulder 15 and the wedge lifted to the position shown in dotted lines in Fig. 4 when the lock nut may be readily turned off the bolt.

There has thus been provided a simple and efficient device of the kind described and for the purpose specified.

Having thus described my invention, what is claimed as new is:—

1. A lock nut comprising a resilient split ring threaded interiorly and provided with a wedge located and pivotally mounted in the split of the ring, said wedge having a biting edge adapted to engage the threads of a bolt when screwed thereon.

2. A lock nut comprising a body having a threaded opening therethrough and a tapered slot leading therefrom, lugs on said body on either side of said slot, said lugs being provided with notches at one end, a tapered wedge located in said slot and provided with an inwardly extending lug having a groove running longitudinally thereof to provide cutting edges, and a pin passing through said wedge and seated in the notches in the first mentioned lugs.

In testimony whereof I hereunto affix my signature in presence of two witnesses.

EMANUEL A. KAMERER.

Witnesses:
J. W. McDANIEL,
E. L. PENTECOST.

Copies of this patent may be obtained for five cents each, by addressing the "Commissioner of Patents, Washington, D. C."